United States Patent
Bae et al.

(10) Patent No.: US 8,469,674 B2
(45) Date of Patent: Jun. 25, 2013

(54) OPERATION CONTROL DEVICE AND METHOD OF COMPRESSOR

(75) Inventors: Gyoo-Jong Bae, Seoul (KR); Yang-Jun Kang, Seoul (KR); Kyeong-Bae Park, Seoul (KR); Chul-Gi Roh, Seoul (KR); Ki-Chul Choi, Seoul (KR); Eon-Pye Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 1603 days.

(21) Appl. No.: 11/791,473

(22) PCT Filed: Nov. 25, 2005

(86) PCT No.: PCT/KR2005/004003
§ 371 (c)(1),
(2), (4) Date: May 24, 2007

(87) PCT Pub. No.: WO2006/057529
PCT Pub. Date: Jun. 1, 2006

(65) Prior Publication Data
US 2008/0089792 A1    Apr. 17, 2008

(30) Foreign Application Priority Data
Nov. 26, 2004 (KR) .................. 10-2004-0098188

(51) Int. Cl.
*F04B 49/06* (2006.01)
(52) U.S. Cl.
USPC ............. 417/44.1; 417/44.2; 417/44.11
(58) Field of Classification Search
USPC ................. 417/44.1, 44.2, 44.11
See application file for complete search history.

(56) References Cited

U.S. PATENT DOCUMENTS

| | | | | |
|---|---|---|---|---|
| 3,896,355 A | * | 7/1975 | Guicheteau | 318/752 |
| 4,935,691 A | * | 6/1990 | Lamar | 323/323 |
| 5,455,886 A | * | 10/1995 | Glenn et al. | 388/838 |
| 6,616,414 B2 | | 9/2003 | Yoo et al. | |
| 6,844,698 B1 | * | 1/2005 | Kwon et al. | 318/778 |
| 6,934,140 B1 | * | 8/2005 | Rober et al. | 361/154 |
| 2002/0062652 A1 | | 5/2002 | Hwang et al. | |
| 2002/0171983 A1 | * | 11/2002 | Brooks, Jr. | 361/2 |
| 2003/0026702 A1 | * | 2/2003 | Yoo et al. | 417/44.11 |
| 2003/0209015 A1 | | 11/2003 | Song | |

FOREIGN PATENT DOCUMENTS

| | | |
|---|---|---|
| CN | 2078955 | 6/1991 |
| CN | 1356469 | 7/2002 |
| CN | 1492149 | 4/2004 |
| JP | 2002-213367 | 7/2002 |
| JP | 2003-120452 | 4/2003 |
| JP | 2003-328954 | 11/2003 |

* cited by examiner

*Primary Examiner* — Charles Freay
*Assistant Examiner* — Christopher Bobish
(74) *Attorney, Agent, or Firm* — McKenna Long & Aldridge LLP

(57) ABSTRACT

Disclosed are an operation control device of a compressor, which can reduce motor loss by applying an AC power to a motor of the compressor without a switching operation of a control unit, and a method thereof. The operation control device of the compressor comprises: a capacitor electrically connected to a motor of the compressor and having a predetermined capacitance; a control unit connected in series to the motor of the compressor and applying an AC power to the motor of the compressor according to a control signal; and a controller detecting a load variation amount on the basis of a current and voltage applied to the motor of the compressor and controlling on/off of the control unit according to the detected load variation amount.

7 Claims, 4 Drawing Sheets

OPERATION CONTROL DEVICE AND METHOD OF COMPRESSOR

This application claims priority to International application No. PCT/KR2005/004003 filed on 25 Nov. 2005, and Korean Application No. 10-2004-0098188 filed on 26 Nov. 2004, all of which are incorporated by reference, as is fully set forth herein.

TECHNICAL FIELD

The present invention relates to a compressor, and more particularly, to an operation control device and method of a compressor.

BACKGROUND ART

In general, a compressor, particularly, a reciprocating compressor has no crankshaft for converting a rotating movement to a linear movement, thereby having small friction loss and so having higher efficiency in compression than that of a general compressor.

In case that the reciprocating compressor is used for a refrigerator or an air conditioner, as a stroke voltage inputted to the reciprocating compressor is varied, a compression ratio of the reciprocating compressor can be varied to control cooling capacity. Such a reciprocating compressor according to the related art will now be described with reference to FIG. 1.

FIG. 1 is a block diagram showing a structure of an operation control device of the reciprocating compressor in accordance with the related art.

As shown in FIG. 1, the operation control device of the reciprocating compressor according to the related art includes: a current detector 4 for detecting a current applied to a motor (not shown) of the reciprocating compressor 6; a voltage detector 3 for detecting a voltage applied to the motor; a stroke estimator 5 for estimating a stroke estimation value by using the detected current and voltage and a parameter of the motor; a comparator 1 for comparing the calculated stroke estimation value with a preset stroke reference value and outputting a difference value according to the comparison result; and a stroke controller 2 for controlling the operation (stroke) of the compressor 6 by varying the voltage applied to the motor by controlling a turn-on period of a triac (not shown) connected in series with the motor according to the difference value.

Hereinafter, operations of the operation control device of a reciprocating motor compressor in accordance with the related art will now be described with reference to FIG. 1.

First, the current detector 4 detects the current applied to the motor (not shown) of the reciprocating motor compressor 6 and outputs the detected current value to the stroke estimator 5. The voltage detector 3 detects the voltage applied to the motor and outputs the detected voltage value to the stroke estimator 5.

The stroke estimator 5 operates the stroke estimated value X of the reciprocating compressor by substituting the detected current value, the detected voltage value and the parameters of the motor to following formula 1, and applies the operated stroke estimated value X to the comparator 1.

$$X = \frac{1}{\alpha} \int (V_M - Ri - L\dot{i})dt \qquad \text{Formula 1}$$

Here, R represents the resistance of the motor, L represents the inductance of the motor, a represents the motor constant, $V_M$ represents the voltage value applied to the motor, and represents the current value applied to the motor of the reciprocating compressor, and i represents the time variation amount of the current applied to the motor. That is, $\dot{i}$ is a differential value of i.

Afterwards, the comparator 1 compares the stroke estimation value with the stroke reference value, and applies the difference value according to the comparison result to the stroke controller 2.

The controller 2 controls the stroke of the compressor 6 by varying the voltage applied to the motor of the compressor 6 on the basis of the difference value. This will now be explained with reference to FIG. 2.

FIG. 2 is a flow chart showing an operation control method of a reciprocating compressor according to the related art.

First, when the stroke estimation value is applied to the comparator 1 by the stroke estimator 5, the comparator 1 compares the stroke estimation value with the pre-determined stroke reference value (S2), and outputs the difference value according to the comparison result to the stroke controller 2.

When the stroke estimation value is smaller than the stroke reference value, the stroke controller 2 increases the voltage applied to the motor (S3), and when the stroke estimation value is larger than the stroke reference value, the stroke controller 2 decreases the voltage applied to the motor (S4), thereby controlling the stroke of the compressor. The voltage is applied to the motor by controlling a turn-on period of a triac (not shown) electrically connected to the motor when increasing or decreasing the voltage applied to the motor, As the reciprocating compressor is applied with an AC voltage, it reacts sensitively to a supplied AC voltage as well as load variation amounts.

Accordingly, the conventional operation control device of the reciprocating compressor always uses a control unit (triac) because it is sensitive to variation amounts in commercially used AC voltage.

That is, the conventional operation control device of the reciprocating compressor controls the stroke of the piston by using a control unit because AC voltages vary under a normal operation condition as well as under an abnormal operation condition in which the load rapidly varies.

DISCLOSURE OF INVENTION

Technical Problem

The conventional operation control device of the reciprocating compressor has the following problems.

First, in the case that the reciprocating compressor use a commercially used AC power supply, it should always use a control unit because it is sensitive to voltage variation amounts in AC power supply. That is, as the voltage of the AC power supply continues to vary even under a normal operation as well as under a condition in which the load rapidly varies, the stoke of a piston has to be controlled by using a control unit.

Second, as a voltage is switched and applied to the motor of the reciprocating compressor by a control unit (triac), a high frequency noise is generated, and thus an additional circuit for eliminating this noise is required.

Third, when a triac is used as the control unit, an electric power used in the triac is required. According to an experiment, the triac uses an electric power of about 6 W.

Fourth, as the control unit performs an electrically rapid switching operation, a high voltage is applied to both ends of the control unit the instant when the control unit is turned off, and accordingly the control unit is damaged due to the high voltage. Further, in case of using a high withstand voltage control unit, the cost of implementing the operation control device of the reciprocating compressor is increased.

As described above in detail, the operation control device of the reciprocating compressor according to the related art is problematic in that it is lowered in operating efficiency due to an electric power used in the control unit and a high frequency noise generated from the control unit, and it is damaged due to a high voltage instantaneously applied according to a rapid switching operation of the control unit, thereby deteriorating the reliability of the operation control device of the reciprocating compressor.

Technical Solution

Hereinafter, preferred embodiments will be described in detail with reference to FIGS. 3 to 5 with respect to an operation control device of a reciprocating compressor, which can reduce motor loss by cutting off high frequency noise and overvoltage caused by a switching operation of a control unit by having a capacitor having a capacitance set so that a resonance frequency obtained by calculating the inductance of the compressor motor and the capacitance can be larger than the frequency of an AC power, detecting a load variation amount on the basis of a current and voltage applied to a motor of the compressor and controlling on/off of a control unit according to the detected load variation amount.

FIG. 3 is a block diagram showing the configuration of an operation control device of a reciprocating compressor according to a first embodiment of the present invention.

As depicted in FIG. 3, the operation control device of a reciprocating compressor according to the present invention comprises: a power supply unit AC supplying an AC power of a predetermined frequency; a motor M of the reciprocating compressor having a predetermined inductance; a capacitor C1 electrically connected to the motor M of the reciprocating compressor and having a predetermined capacitance; a control unit Tr connected in series to the motor M of the reciprocating compressor and applying the AC power to the motor of the reciprocating compressor according to a control signal; a current detector 40 detecting a current applied to the motor M of the reciprocating compressor; a voltage detector 30 detecting a voltage applied to the motor M of the reciprocating compressor; a stroke estimator 50 estimating a stroke by calculating the current and voltage applied to the motor M of the reciprocating compressor; a comparator 10 comparing the estimated stroke with a stroke reference value and outputting a difference value according to the comparison result; and a controller 20 detecting a load variation amount on the basis of a phase difference between the estimated stroke and the current applied to the motor and generating a control signal for turning on/off the control unit according to the detected load variation amount or a control signal for controlling a turn-on/turn-off period of the control unit Tr according to the detected load variation amount.

The power supply unit AC may be a 220V AC power commonly used in homes and factories. Accordingly, a voltage continues to vary according to time.

The control unit Tr is comprised of a switching device such as a triac or inverter. The motor M of the reciprocating compressor is run by flux variation amounts by winding a winding coil around a stator or rotor of the motor M. Therefore, it is assumed that an equivalent circuit can be constructed by a coil having a predetermined inductance.

The capacitor C1 has a predetermined capacitance, and connected in series to the motor M of the reciprocating compressor.

Here, according to the present invention, a method of setting the capacitance of the capacitor C1 will be described.

If the inductance of the reciprocating compressor is L and the capacitance of the capacitor C1 is C, a resonance frequency can be obtained as follows:

$$F_{LC\text{-}resonance} = \frac{1}{2\Pi\sqrt{LC}}$$

Meanwhile, if a rated power frequency is consistent, it is indicated as $F_{input\_Rate}$. Thus, the method of setting the resonance frequency to be larger than the rated power frequency can be known in the following formula:

$$F_{LC\text{-}resonance} = \frac{1}{2\Pi\sqrt{LC}} > F_{Input\text{-}Rate}$$

That is, the capacitance C of the capacitor C1 is set so that a resonance frequency obtained by calculating the inductance of the compressor motor and the capacitance can be larger than the rated power frequency.

FIG. 4 is a graph illustrating a target stroke of the reciprocating compressor according to a rated power.

As depicted in FIG. 4, it can be found that a change in target stroke is small according to a change in rated power at a point where the resonance frequency $F_{LC\_resonancee}$ is set higher than the rated power frequency $F_{input\_Rate}$. That is to say, it can be found that a change in cooling capacity proportional to a target stroke is small.

Namely, the stroke movement of the piston according to a change in rated power is dull. Therefore, under a normal condition in which a variation amount in load or AC power is not large, there is no big change in cooling capacity produced by the reciprocating compressor even if an AC power is used as it is.

Consequently, the compressor can be run merely by setting the resonance frequency higher than the rated power frequency without a big change in cooling capacity even if no control unit is used.

Hence, in the first embodiment, the present invention is configured to detect a load variation amount by the controller 20, compare the detected load variation amount with a preset reference load variation amount and determine whether to use a switching operation of the control unit Tr on the basis of the comparison result.

That is, if a load variation amount is detected and the detected load variation amount is larger than a reference load variation amount (recognized as an overload), the controller 20 varies an AC power applied to the motor M of the reciprocating compressor by controlling a turn-on/turn-off period of the control unit Tr according to a difference between a stroke estimated by the stroke estimator 5 and a stroke reference value.

On the other hand, if a load variation amount is detected and the detected load variation amount is smaller than a reference load variation amount (recognized as a normal load), the controller 20 applies an AC power of the power supply unit AC to the motor M of the reciprocating compressor by turning on the control unit Tr.

Here, the controller 20 detects a load variation amount by using a phase difference between the stroke estimated by the stroke estimator 5 and the current applied to the motor M of the reciprocating compressor.

The reference load variation amount is preset to an optimum value by an experiment.

In another embodiment, the present invention can be configured to detect a variation amount in AC power by the controller 20, compare the detected variation amount in AC power with the preset reference variation amount and determine whether to use a switching operation of the control unit Tr1 on the basis of the comparison result.

That is, if a variation amount of an AC power is detected and the detected variation amount of the AC power is larger than a reference variation amount, the controller 20 varies the AC power applied to the motor M of the reciprocating compressor by controlling a turn-on/turn-off period of the control unit Tr according to a difference between a stroke estimated by the stroke estimator 5 and a stroke reference value.

On the other hand, if a variation amount of an AC power is detected and the detected variation amount of the AC power is smaller than a reference variation amount (recognized as a normal load), the controller 20 applies the AC power of the power supply unit AC to the motor M of the reciprocating compressor by turning on the control unit Tr.

Here, the controller 20 is provided with a detection unit for detecting an AC power variation amount.

The reference variation amount is preset to an optimum value by an experiment.

That is to say, the present invention is capable of reducing the loss of the reciprocating compressor caused from an overvoltage or high frequency noise generated by a switching operation of the control unit by applying an AC power outputted from the power supply unit to the motor of the reciprocating compressor according to a load variation amount or AC power variation amount without a switching operation of the control unit.

FIG. 5 is a block diagram showing the configuration of an operation control device of a reciprocating compressor according to a second embodiment of the present invention.

As depicted in FIG. 5, the operation control device of a reciprocating compressor according to the present invention comprises: a power supply unit AC supplying an AC power of a predetermined frequency; a motor M of the reciprocating compressor having a predetermined inductance; a capacitor C1 electrically connected to the motor M of the reciprocating compressor and having a predetermined capacitance; a control unit Tr connected in series to the motor M of the reciprocating compressor and applying the AC power to the motor of the reciprocating compressor according to a control signal; a switch unit 100 selecting the front end or rear end of the control unit Tr, being switched by the control signal; a current detector 40 detecting a current applied to the motor M of the reciprocating compressor; a voltage detector 30 detecting a voltage applied to the motor M of the reciprocating compressor; a stroke estimator 50 estimating a stroke by calculating the current and voltage applied to the motor M of the reciprocating compressor; a comparator 10 comparing the estimated stroke with a stroke reference value and outputting a difference value according to the comparison result; and a controller 20 detecting a load variation amount on the basis of a phase difference between the estimated stroke and the current applied to the motor and generating a control signal for turning on/off the control unit according to the detected load variation amount or a control signal for controlling a turn-on/turn-off period of the control unit Tr according to the detected load variation amount.

The capacitance C of the capacitor C1 is set to a value for setting the resonance frequency calculated from the inductance of the compressor to be larger than the rated power frequency.

Preferably, a mechanical switch or relay is used as the switch unit 100.

In the second embodiment, the switch unit 100 is further added to the first embodiment. The operation of the second embodiment is described.

First, even if an AC power outputted from the power supply unit A is passed through as it is by turning on the control unit Tr, the current passing through the control unit Tr generates a loss due to the resistance of the control unit Tr.

Therefore, if a load variation amount is larger than a reference load variation amount or an AC power variation amount is larger than a normal variation amount (abnormal state), the controller 20 varies an AC power applied to the motor M of the reciprocating compressor by controlling a turn-on/turn-off period of the control unit Tr according to a difference between a stroke estimated by the stroke estimator 5 and a stroke reference value.

On the other hand, if a load variation amount is smaller than a reference load variation amount or an AC power variation amount is smaller than a normal variation amount (normal state), the loss of the control unit Tr can be improved by cutting off a current path to the control unit Tr by turning on the control unit Tr.

FIG. 6 is a block diagram showing the configuration of an operation control device of a reciprocating compressor according to a third embodiment of the present invention.

As depicted in FIG. 6, the operation control device of a reciprocating compressor according to the present invention comprises: a power supply unit AC supplying an AC power of a predetermined frequency; a motor M of the reciprocating compressor having a predetermined inductance; a first capacitor C1 electrically connected to the motor M of the reciprocating compressor and having a predetermined capacitance; a second capacitor C2 connected in parallel with the first capacitor and having the same capacitance as the first capacitor C1; a switch unit 200 selecting the first capacitor C1 by a control signal or selecting the first capacitor C1 and second capacitor C2 connected in parallel; a control unit Tr connected in series to the motor M of the reciprocating compressor and applying the AC power to the motor of the reciprocating compressor according to a control signal; a switch unit 100 selecting the front end or rear end of the control unit Tr, being switched by the control signal; a current detector 40 detecting a current applied to the motor M of the reciprocating compressor; a voltage detector 30 detecting a voltage applied to the motor M of the reciprocating compressor; a stroke estimator 50 estimating a stroke by calculating the current and voltage applied to the motor M of the reciprocating compressor; a comparator 10 comparing the estimated stroke with a stroke reference value and outputting a difference value according to the comparison result; and a controller 20 detecting a load variation amount on the basis of a phase difference between the estimated stroke and the current applied to the motor, and if the detected load variation amount is smaller than a reference load variation amount, generating a control signal for turning on/off the control unit according to the detected load variation amount or a control signal for selecting the first capacitor C1 by turning off the switch unit 200 or if the detected load variation amount is larger than a reference load variation amount, generating a control signal for controlling a turn-on/turn-off period of the control unit Tr and a control signal for selecting the first capacitor C1 and the second capacitor C2 connected in parallel with each other by turning on the switch unit 200.

Accordingly, when the switch unit 200 is turned off by the control signal of the controller 20, only the first capacitor C1 is connected to the control unit Tr, and when it is turned on by the control signal of the controller 20, the first capacitor C1 and the second capacitor C2 are connected in parallel to be connected to the control unit Tr.

The capacitance C of the capacitor C1 and second capacitor C2 is set so that a resonance frequency obtained by calculating the inductance of the compressor motor and the capacitance can be larger than the rated power frequency.

Here, the operation of the third embodiment of the invention will be described.

Like general semiconductor control devices, the control unit Tr of the present invention performs an electrically rapid switching operation when it is operated. At this time, a high voltage is applied to both ends of the control unit Tr1 by a voltage charged in the capacitor the instant when the control unit Tr is turned off, which causes a damage of the control unit.

Moreover, the use of a control unit Tr having a high withstand voltage increases the cost. To avoid this, in a case where the control unit is operated, that is, a load variation amount or AC power variation amount is large, the controller 20 turns on the switch unit 200 so that a current flows in the first capacitor C1 and second capacitor C2. Accordingly, as the capacitance is increased by the first capacitor and second capacitor connected in parallel, the control unit Tr can be protected by lowering the voltage applied to the control unit Tr. That is, a low-priced control unit having a low withstand voltage can be used.

Further, if it is judged as a normal condition in which the load variation amount or AC power variation amount is nor large, the controller 20 turns on the control unit Tr to apply the AC power outputted from the power supply unit AC to the motor M of the reciprocating compressor.

Also in the third embodiment of the invention, a switch device 100 as in the second embodiment is added. Thus, under a condition in which the load variation amount or AC power variation amount is not large, the AC power outputted from the power supply unit AC is applied to the motor M of the reciprocating compressor by cutting off a current path flowing through the control unit Tr, and under a condition in which the load variation amount or AC power variation amount is large, the AC power of the power supply unit AC is applied to the motor M of the reciprocating compressor according to the switching operation of the control unit Tr, thereby improving the operating efficiency of the power supply unit AC.

Hereinafter, the operation of the operation control device of the reciprocating compressor according to the present invention will be described in detail with reference to FIGS. 4 to 8.

FIG. 7 is a flow chart showing an operation control method of a reciprocating compressor according to a first embodiment of the present invention.

First, the current detector 40 detects the current applied to the motor M of the reciprocating motor compressor and outputs the detected current value to the stroke estimator 50 and the controller 20 (SP11).

The voltage detector 30 detects the voltage applied to the motor M of the reciprocating compressor and outputs the detected voltage value to the stroke estimator 50 (SP11).

The stroke estimator 5 estimates the stroke of the reciprocating compressor on the basis of the current value outputted from the current detector 40 and the voltage value outputted from the voltage detector 30, and outputs the estimated stroke to the comparator 10 and the controller 20 (SP12)

Thereafter, the controller 20 detects a phase difference between the current outputted from the current detector 40 and the stroke outputted from the stroke estimator 50 and detects a load variation amount by the phase difference between the current and the stroke (SP13).

Meanwhile, the comparator 10 compares the estimated stroke with a stroke reference value, and outputs a difference value according to the comparison result.

Then, the controller 20 controls on/off of the control unit Tr according to the load variation amount.

If the detected load variation amount is larger than a preset reference load variation amount (SP14), the controller 20 varies an AC power applied to the motor M of the reciprocating compressor by turning on/off the control unit Tr (SP16). At this time, the controller 20 varies the AC power applied to the motor M of the reciprocating compressor by controlling a turn-on/turn-off period of the control unit Tr according to the difference value.

If the detected load variation amount is smaller than a preset reference load variation amount (SP14), the controller 20 applies the AC power to the motor M of the reciprocating compressor by turning on the control unit Tr (SP15).

In the same construction as in FIG. 5 in another embodiment, if the detected load variation amount is smaller than a preset reference load variation amount, the controller 20 applies the AC power outputted from the power supply unit AC to the motor M of the reciprocating compressor as it is by cutting off a current path to the control unit Tr by turning on the switch unit 100, and if the detected load variation amount is larger than a preset reference load variation amount, it applies the AC power to the motor of the reciprocating compressor after varying it by controlling a turn-on/turn-off period of the control unit Tr.

In another embodiment of the operation control method of the reciprocating compressor according to the present invention, if the load variation amount is larger than a preset reference load variation amount, it is preferred to increase the capacitance by connecting a plurality of capacitors in parallel and applying the AC power to the motor M of the reciprocating compressor after varying it by controlling a turn-on/turn-off period of the control unit Tr.

FIG. 8 is a flow chart showing an operation control method of a reciprocating compressor according to a second embodiment of the present invention.

First, the controller 20 detects a variation amount of an AC power outputted from the power supply unit AC (SP21), and compares the detected variation amount of the AC power with a preset reference variation amount (SP22).

As a result of comparison, if the detected AC power variation amount is larger than the preset reference variation amount, the controller 20 varies the AC power applied to the motor M of the reciprocating compressor by turning on/off the control unit Tr (SP24). At this time, the controller 20 varies the AC power applied to the motor M of the reciprocating compressor by controlling a turn-on/turn-off period of the control unit Tr according to the difference value.

If the detected AC power variation amount is smaller than the preset reference variation amount (SP22), the controller 20 applies the AC power to the motor M of the reciprocating compressor as it is by turning on the control unit Tr.

In the same construction as in FIG. 5 in another embodiment, if the detected AC power variation amount is smaller than a preset reference AC power variation amount, the controller 20 applies the AC power outputted from the power supply unit AC to the motor M of the reciprocating compressor as it is by cutting off a current path to the control unit Tr by turning on the switch unit 100, and if the detected AC power variation amount is larger than a preset reference AC power variation amount, it applies the AC power to the motor of the reciprocating compressor after varying it by controlling a turn-on/turn-off period of the control unit Tr.

In another embodiment of the operation control method of the reciprocating compressor according to the present invention, if the AC power variation amount is larger than a preset reference AC power variation amount, as shown in FIG. 6, it is preferred to increase the capacitance by connecting a plurality of capacitors in parallel and applying the AC power to the motor M of the reciprocating compressor after varying it by controlling a turn-on/turn-off period of the control unit Tr.

Advantageous Effects

As described above in detail, the operation control device and method of the reciprocating compressor according to the present invention can improve the operating efficiency of a compressor motor by cutting off high frequency noise and overvoltage caused by a switching operation of a control unit by applying an AC power to the motor of the compressor as it is according to a load variation amount of the compressor or a variation amount in AC power applied to the motor of the compressor without suing a control unit for a predetermined time.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
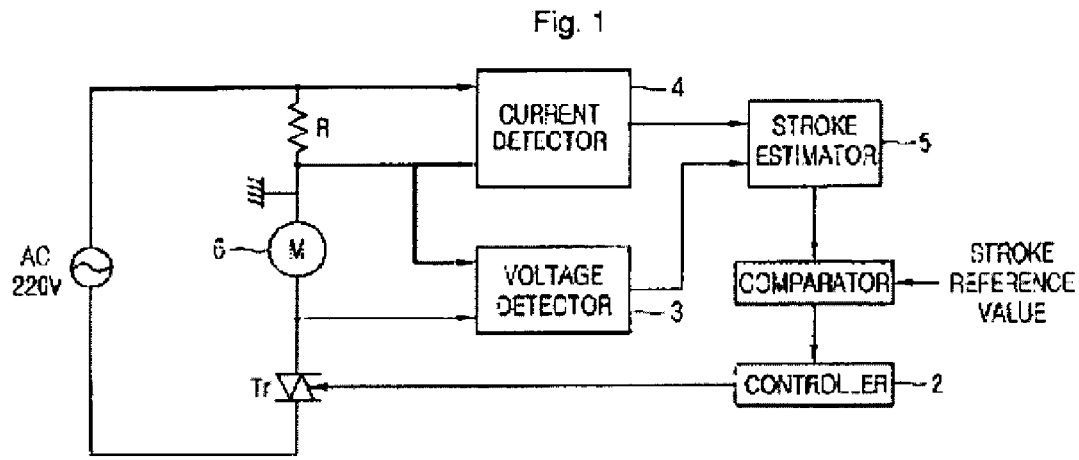
FIG. 1 is a block diagram showing a structure of an operation control device of the reciprocating compressor in accordance with the related art.
Figure 2:
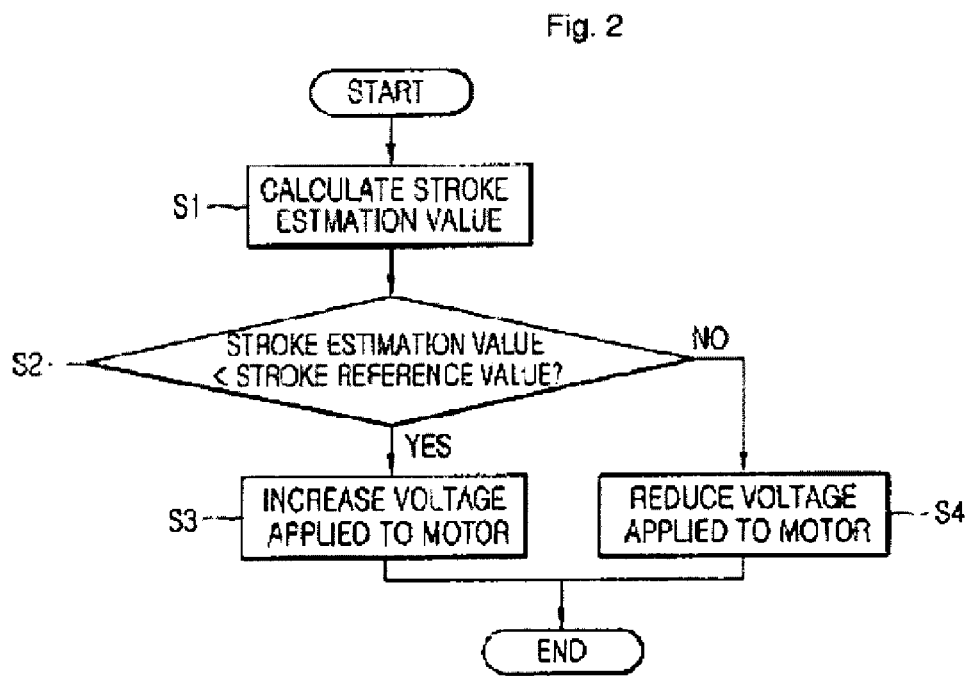
FIG. 2 is a flow chart showing an operation control method of a reciprocating compressor according to the related art.
Figure 3:
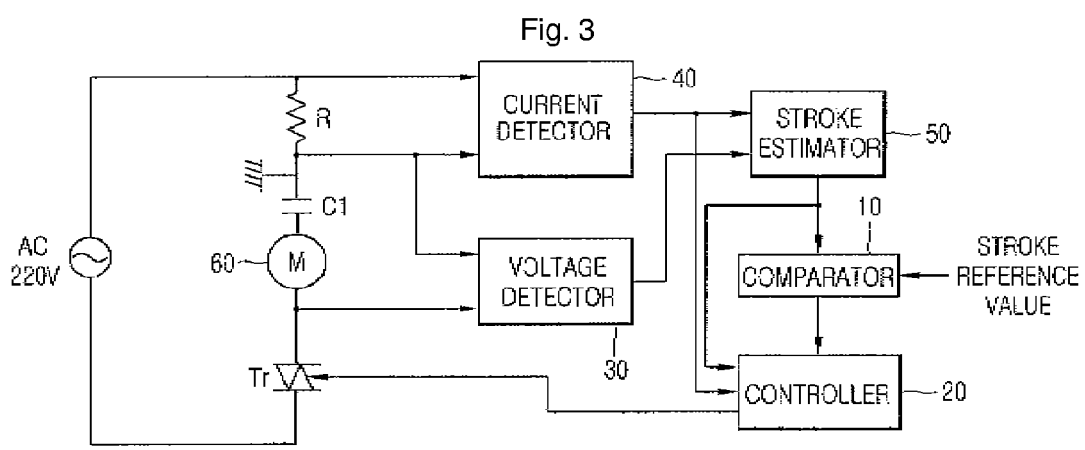
FIG. 3 is a block diagram showing the configuration of an operation control device of a reciprocating compressor according to a first embodiment of the present invention.
Figure 4:
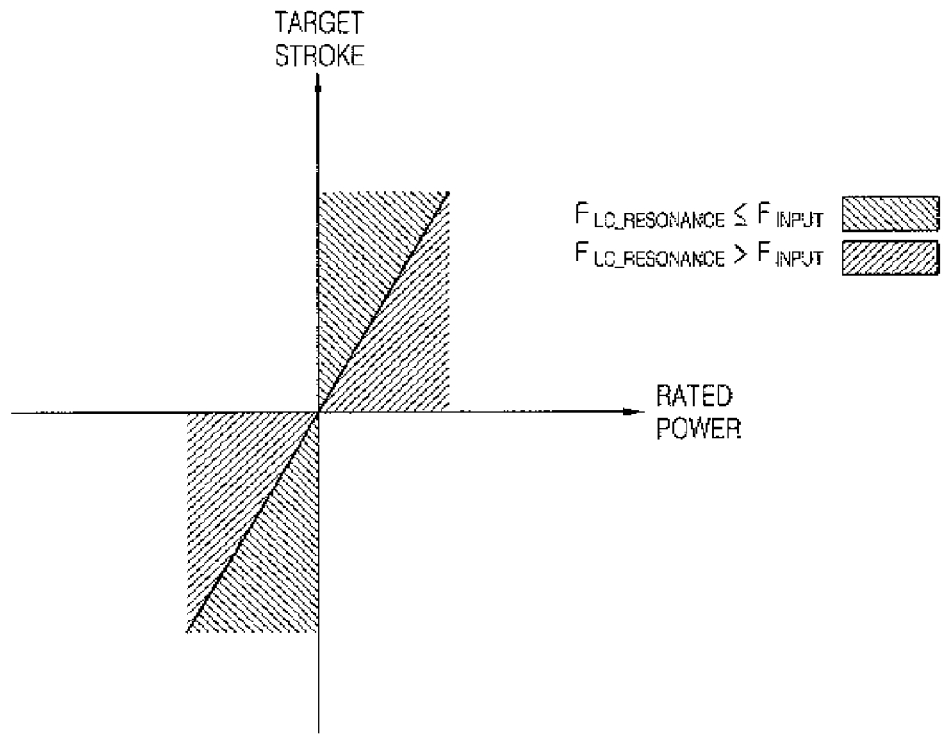
FIG. 4 is a graph illustrating a target stroke of the reciprocating compressor according to a rated power.
Figure 5:
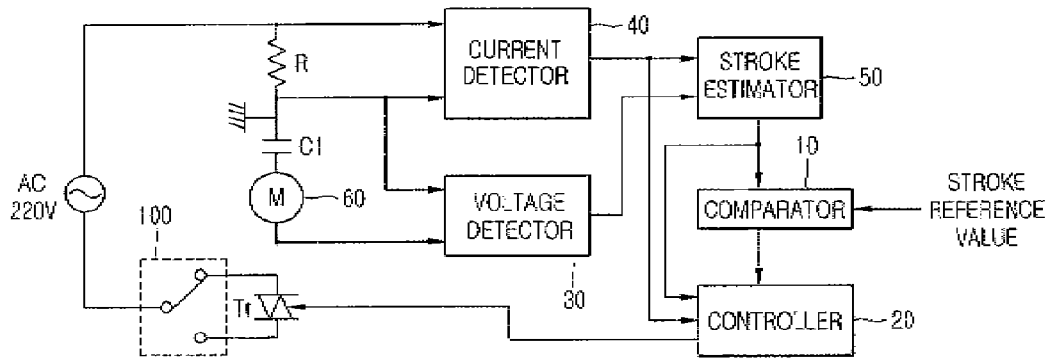
FIG. 5 is a block diagram showing the configuration of an operation control device of a reciprocating compressor according to a second embodiment of the present invention.
Figure 6:
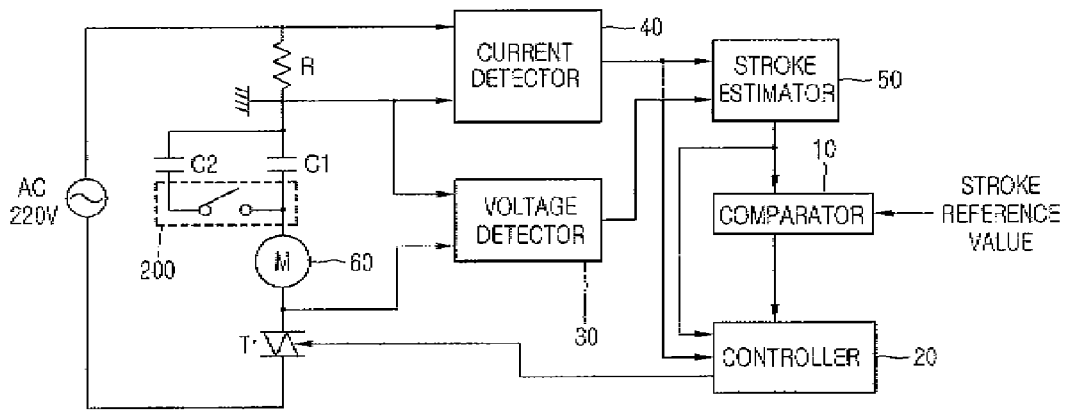
FIG. 6 is a block diagram showing the configuration of an operation control device of a reciprocating compressor according to a third embodiment of the present invention.
Figure 7:
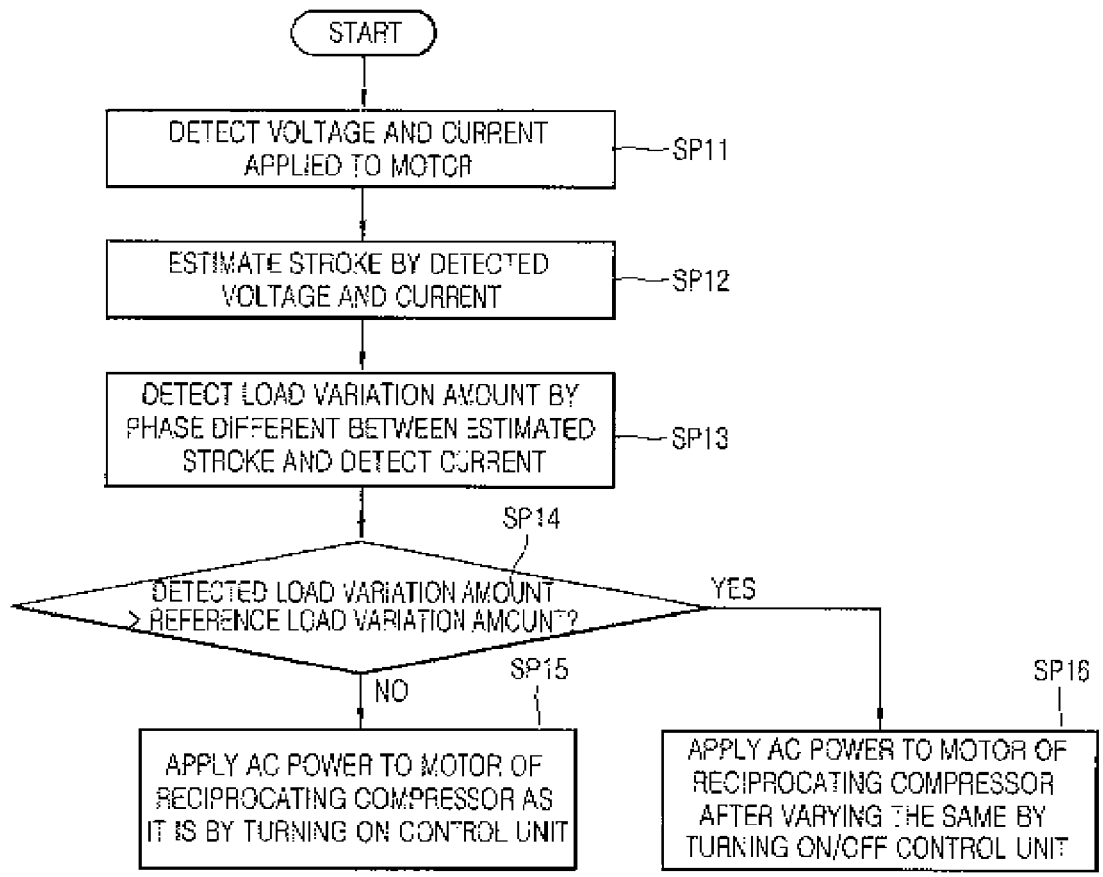
FIG. 7 is a flow chart showing an operation control method of a reciprocating compressor according to a first embodiment of the present invention.
Figure 8:
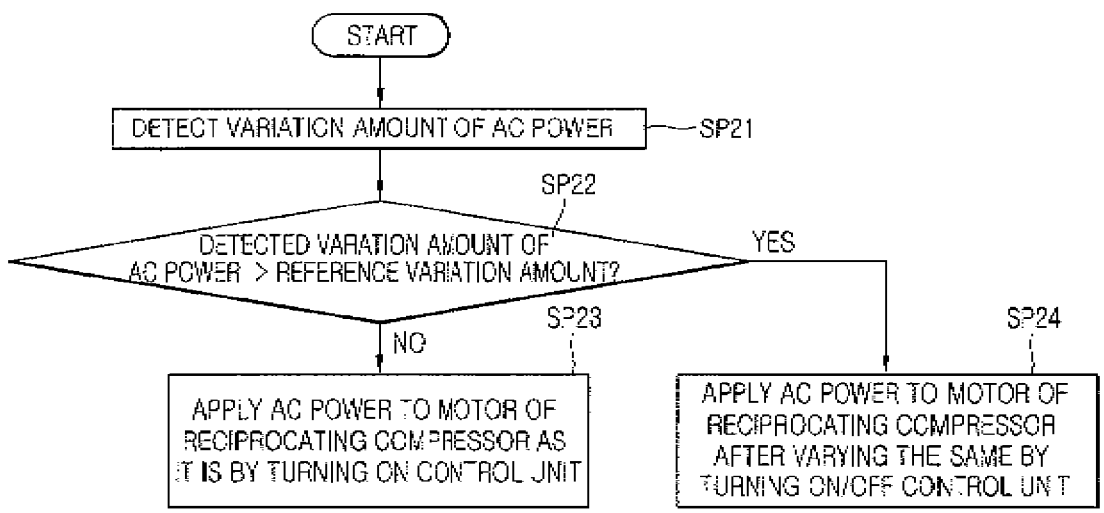
FIG. 8 is a flow chart showing an operation control method of a reciprocating compressor according to a second embodiment of the present invention.

The invention claimed is:

1. An operation control device of a compressor, comprising:
    a capacitor electrically connected to a motor of the compressor and having a predetermined capacitance;
    a control unit connected in series to the motor of the compressor and applying an AC power to the motor of the compressor according to a control signal;
    a controller estimating a stroke by a current and voltage applied to the motor of the compressor, detecting a load variation amount on the basis of a phase difference between the estimated stroke and the current and controlling on/off of the control unit according to the detected load variation amount; and
    a switch unit for selecting the front end or rear end of the control unit, being switched by the control signal of the controller,
    wherein if the detected load variation amount is larger than a preset reference load variation amount, the controller varies the AC power to the motor of the compressor by controlling a turn-on/turn-off period of the control unit after connecting the switch unit to the rear end of the control unit, and
    wherein if the detected load variation amount is smaller than the preset reference load variation amount, the controller applies the AC power to the motor of the compressor without the control unit by connecting the switch unit to the front end of the control unit.

2. An operation control device of a reciprocating compressor, comprising:
    a power supply unit supplying an AC power of a predetermined frequency;
    a reciprocating compressor having a predetermined inductance;
    a capacitor electrically connected to a motor of the reciprocating compressor and having a predetermined capacitance;
    a control unit connected in series to the motor of the reciprocating compressor and applying the AC power to the motor of the reciprocating compressor according to a control signal;
    a current detector detecting a current applied to the motor of the reciprocating compressor;
    a voltage detector detecting a voltage applied to the motor of the reciprocating compressor;
    a stroke estimator estimating a stroke by calculating the current and voltage applied to the motor of the reciprocating compressor;
    a controller detecting a load variation amount on the basis of a phase difference between the estimated stroke and the current applied to the motor and controlling on/off of the control unit according to the detected load variation amount;
    a switch unit for selecting the front end or rear end of the control unit, being switched by the control signal of the controller; and
    a further switch unit selectively connecting the capacitors in parallel by the control signal of the controller,
    wherein if the detected load variation amount is larger than a preset reference load variation amount, the controller varies the AC power to the motor of the compressor by controlling a turn-on/turn-off period of the control unit after connecting the switch unit to the rear end of the control unit, and
    wherein if the detected load variation amount is smaller than the preset reference load variation amount, the controller applies the AC power to the motor of the compressor by connecting the power supply unit to the motor of the compressor directly by connecting the switch unit to the front end of the control unit.

3. The device of claim 2, wherein the capacitance is set so that a resonance frequency obtained by calculating the inductance of the compressor motor and the capacitance can be larger than the frequency of the AC power.

4. The device of claim 2, wherein the capacitor is in a plural form.

5. An operation control method of a reciprocating compressor according to the present invention, comprising the steps of:
   detecting a current applied to the motor of the reciprocating compressor;
   detecting a voltage applied to the motor of the reciprocating compressor;
   estimating a stroke by calculating the current and voltage applied to the motor of the reciprocating compressor;
   detecting a load variation amount on the basis of a phase difference between the estimated stroke and the current applied to the motor of the reciprocating compressor; and
   comparing the detected load variation amount with a preset reference load variation amount and controlling a supply of an AC power applied to a motor of the reciprocating compressor on the basis of the comparison result,
   wherein the step of controlling a supply of an AC power applied to the motor of the reciprocating compressor comprises
   if the detected load variation amount is larger than the preset reference load variation amount according to the comparison result, varying the AC power to the motor of the compressor by controlling a turn-on/turn-off period of the control unit after connecting a switch unit to the rear end of the control unit, and
   if the detected load variation amount is smaller than the preset reference load variation amount, applying the AC power to the motor of the reciprocating compressor without the control unit by connecting the switch unit to the front end of the control unit.

6. The method of claim 5, wherein the step of applying the AC power to the motor of the reciprocating compressor after varying the same further comprises the step of reducing the capacitance by connecting a plurality of capacitors in order to reduce the withstand voltage of the control unit.

7. The method of claim 5, further comprising:
   setting a resonance frequency of the motor and a series capacitance larger than a frequency of the AC power by selectively connecting capacitors in series with the motor.

* * * * *